(12) United States Patent
Wan

(10) Patent No.: US 12,185,110 B1
(45) Date of Patent: Dec. 31, 2024

(54) SYSTEMS AND METHOD FOR AUTHENTICATION AND AUTHORIZATION IN NETWORKS USING SERVICE BASED ARCHITECTURE

(71) Applicant: CABLE TELEVISION LABORATORIES, INC., Louisville, CO (US)

(72) Inventor: Tao Wan, Ottawa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/130,356

(22) Filed: Apr. 3, 2023

Related U.S. Application Data

(63) Continuation of application No. 17/193,960, filed on Mar. 5, 2021, now Pat. No. 11,622,276.

(60) Provisional application No. 63/109,252, filed on Nov. 3, 2020, provisional application No. 63/019,502, filed on May 4, 2020, provisional application No. 63/015,298, filed on Apr. 24, 2020, provisional application No. 63/004,166, filed on Apr. 2, 2020, provisional application No. 63/003,654, filed on Apr. 1, 2020, provisional application No. 62/985,515, filed on Mar. 5, 2020.

(51) Int. Cl.
| | | |
|---|---|---|
| *H04W 12/71* | (2021.01) | |
| *H04W 12/069* | (2021.01) | |
| *H04W 12/08* | (2021.01) | |
| *H04W 12/50* | (2021.01) | |
| *H04W 88/18* | (2009.01) | |

(52) U.S. Cl.
CPC ......... *H04W 12/50* (2021.01); *H04W 12/069* (2021.01); *H04W 12/08* (2013.01); *H04W 12/71* (2021.01); *H04W 88/182* (2013.01)

(58) Field of Classification Search
CPC ............................. H04W 12/08; H04W 12/50
See application file for complete search history.

(56) References Cited

U.S. PATENT DOCUMENTS

| | | |
|---|---|---|
| 10,609,530 B1 | 3/2020 | Patil et al. |
| 2013/0212663 A1 | 8/2013 | Edge et al. |
| 2017/0034164 A1 * | 2/2017 | Khalil ................. H04L 63/0876 |
| 2019/0251241 A1 * | 8/2019 | Bykampadi ......... H04W 12/009 |
| 2021/0250411 A1 | 8/2021 | Cakulev et al. |

* cited by examiner

*Primary Examiner* — Michael T Vu
(74) *Attorney, Agent, or Firm* — Cozen O'Connor

(57) ABSTRACT

Systems and methods for securing network communications between a first device and a second device over a service-based architecture, include receiving, at the first device, an access request including: a request to use a service of the service-based architecture, an authentication public key certificate associated with the second device or a proxy device therefore, a unique identifier of the second device, and a digital signature using the private key associated with the authentication public key certificate. The first device may verify the authentication public key certificate and generate an encrypted access response including an access token that allows access to the service, which is then transmitted back to the second device for further use in accessing the service-based architecture.

15 Claims, 13 Drawing Sheets

SYSTEMS AND METHOD FOR AUTHENTICATION AND AUTHORIZATION IN NETWORKS USING SERVICE BASED ARCHITECTURE

RELATED APPLICATIONS

This application is a continuation of U.S. application Ser. No. 17/193,960 filed Mar. 5, 2021, which claims priority to, and benefits from each of: U.S. Provisional Patent Application Ser. No. 62/985,515, filed Mar. 5, 2020 (entitled "Systems and Methods for Token Based Authorization in 5G Service Based Architecture"); U.S. Provisional Patent Application Ser. No. 63/003,654, filed Apr. 1, 2020 (entitled "Systems and Methods for Token Based Authorization in 5G Service Based Architecture"); U.S. Provisional Patent Application Ser. No. 63/004,166, filed Apr. 2, 2020 (entitled "Systems and Methods for Token Based Authorization in 5G Service Based Architecture"); U.S. Provisional Patent Application Ser. No. 63/015,298, filed Apr. 24, 2020 (entitled "Systems and Methods for Token Based Authorization in 5G Service Based Architecture"); U.S. Provisional Patent Application Ser. No. 63/019,502, filed May 4, 2020 (entitled "Systems and Methods for Token Based Authorization in 5G Service Based Architecture"); and U.S. Provisional Patent Application Ser. No. 63/109,252, filed Nov. 3, 2020 (entitled "System and method for Securing HTTP (sHTTP)"). Each of the aforementioned applications is incorporated by reference in its entirety as if fully set forth in its entirety.

BACKGROUND

Fifth generation (5G) technology is now implemented to increase scalability of wireless networks by not only person-to-person (e.g., cellular phone use), but also Internet of Things and other machine to machine communications. As set forth in the 5G Technical Specification (TS) 23.501 by 3GPP, the 5G network utilizes a service based architecture (SBA) that implements services as a network function (NF) that communicate with each other using representational state transfer application programming interfaces (APIs). 5G Technical Specification 33.501 sets forth Security Architecture and Procedures for the 5G system." Those of ordinary skill in the art will understand that the present disclosure is applicable to, but not limited to, the technology environment discussed in the 5G Technical Specifications, including TS 33.501 and TS 23.501. It should be appreciated, however, that the present embodiments are applicable to other technological environments, as well, without departing from the scope hereof.

FIG. 1 depicts a prior art 5G architecture as described in the various 3GPP technical specifications, and in at least U.S. Patent Application Publication No. US2019/0251241A1, which is incorporated by reference herein. The acronyms referenced in FIG. 1 are known to those of ordinary skill in the art and defined in the technical specifications defined for the 5G architecture by 3GPP. As described similarly with respect to FIG. 3 of the US 2019/0251241A1 disclosure, FIG. 1 depicts a 5G architecture in a configuration comprising a visiting public land mobile network (VPLMN) 110 operatively coupled via an intermediate Internetwork Packet Exchange (IPX) network 120 to a home public land mobile network (HPLMN) 130. More particularly, FIG. 1 illustrates the presence of a Security Edge Protection Proxy (SEPP) at the edge of each PLM network (e.g., vSEPP in VPLMN 110 and hSEPP in HPLMN 130). It is to be appreciated that the various network functions shown in the VPLMN 110 and the HPLMN 130 are known and described in detail in various 5G specifications such as, but not limited to, the above-referenced 3GPP technical specifications 23.501 and 33.501.

In the 5G SBA, services of a particular Network Function (NF) are provided only to authorized NF Service Consumers (e.g., other network functions) upon request. Therefore, service authorization procedures are required to check whether a NF Service Consumer is permitted to access a requested NF Service Producer for consuming a NF Service.

Service authorization grants should be based on the identity and/or other attributes associated with NF Service Consumer, such as the type of NF Service Consumer, and on the service authorization information that is configured in a NF profile of a NF Service Producer. The service authorization information may include the NF type or types and NF realms or origins that are allowed to consume the NF Service(s) of the NF Service Producer.

In 5G SBA, there are multiple NFs requesting services from each other. A service authorization framework is required that supports: (i) NF Service Consumer-NF Service Producer interactions; (ii) authentication of the NF Service Consumer that is requesting access to the service(s) of another NF (e.g., services of a NF Service Producer); (iii) obtaining authorization grants during Network Function Service discovery; (iv) using the obtained authorization grants (e.g., grant of access token by the NRF for accessing other components of the network) during Network Function Service access; and (v) NF and Network Function Service registration and de-registration. In addition, a service authorization framework should be scalable for different network scenarios, including: (i) whether granularity of authorization is for a NF, or for each service within the NF; (ii) whether the granularity is per user; and (iii) whether authorization is time-based, has a duration associated with it, etc. The OAuth 2.0 authorization framework enables third-party applications to obtain limited access to services on behalf of a resource owner by orchestrating an approval interaction between the resource owner and the service, or by allowing a third-party application to obtain access on its own behalf, as described in Internet Engineering Task Force (IETF) Request for Comments (RFC) 6749, entitled "The OAuth 2.0 Authorization Framework," which is incorporated by reference herein.

SUMMARY

The embodiments described herein acknowledge that prior authentication of a consumer NF device requires mutual authentication over a transport layer (e.g., HTTP over TLS structure). While this may be acceptable in direct communication between a first device (e.g., the NRF authentication server, or the producer NF device) and a second device (e.g., consumer NF device), when a proxy device is implemented between the first device and the second device (herein referred to as "indirect communication"), the solution is undesirable because the proxy device prevents the first device and the second device from authenticating each other in the transport layer. Accordingly, the present embodiments resolve this problem by utilizing a client assertion scheme in the layer above the transport layer that may be implemented for both direct and indirect communications. The client assertion scheme includes an end-to-end identity at the message level of the protocol stack by including verifiable identity information when a consumer device is requesting a service from a produce device such as requesting an access token from an NRF. Moreover, in one or more embodiments, the granted access token may be encrypted with a public key of the requesting consumer device to ensure that the requesting consumer device is the first entity to be in possession of the access token.

DETAILED DESCRIPTION OF THE EMBODIMENTS

Figure 1:
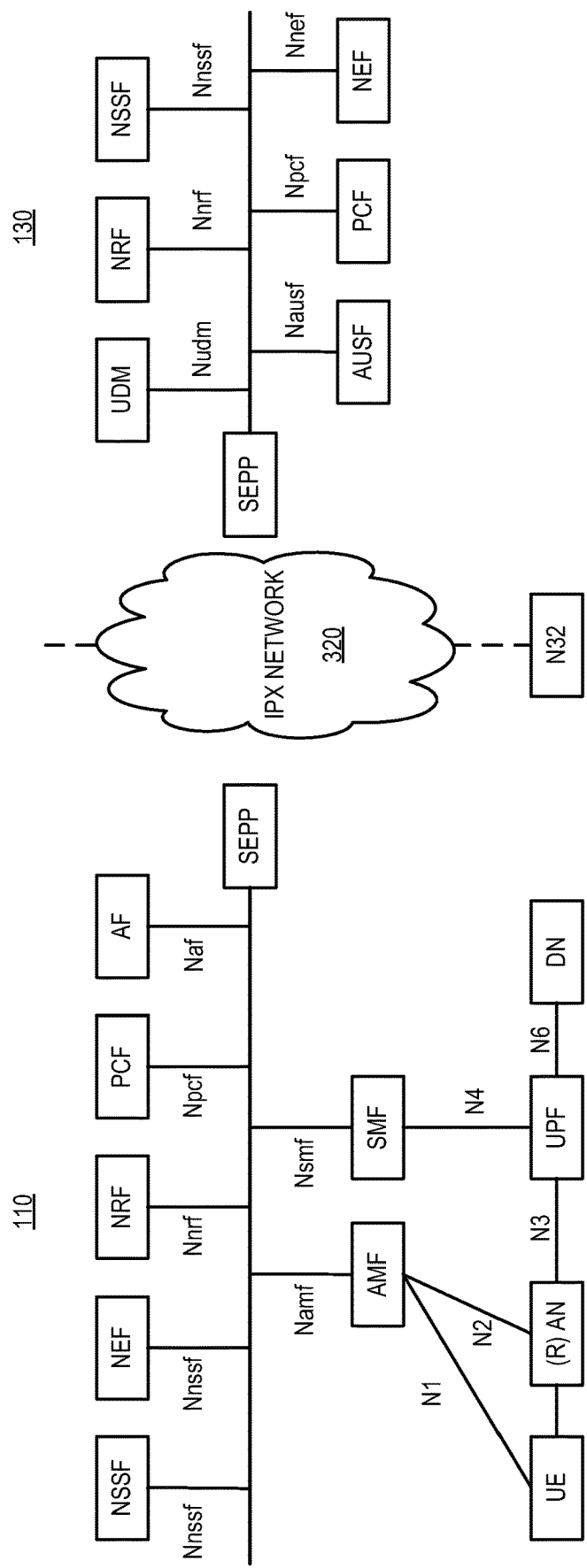
FIG. 1 depicts a prior art 5G architecture as described in the various 3GPP technical specifications.
Figure 2:
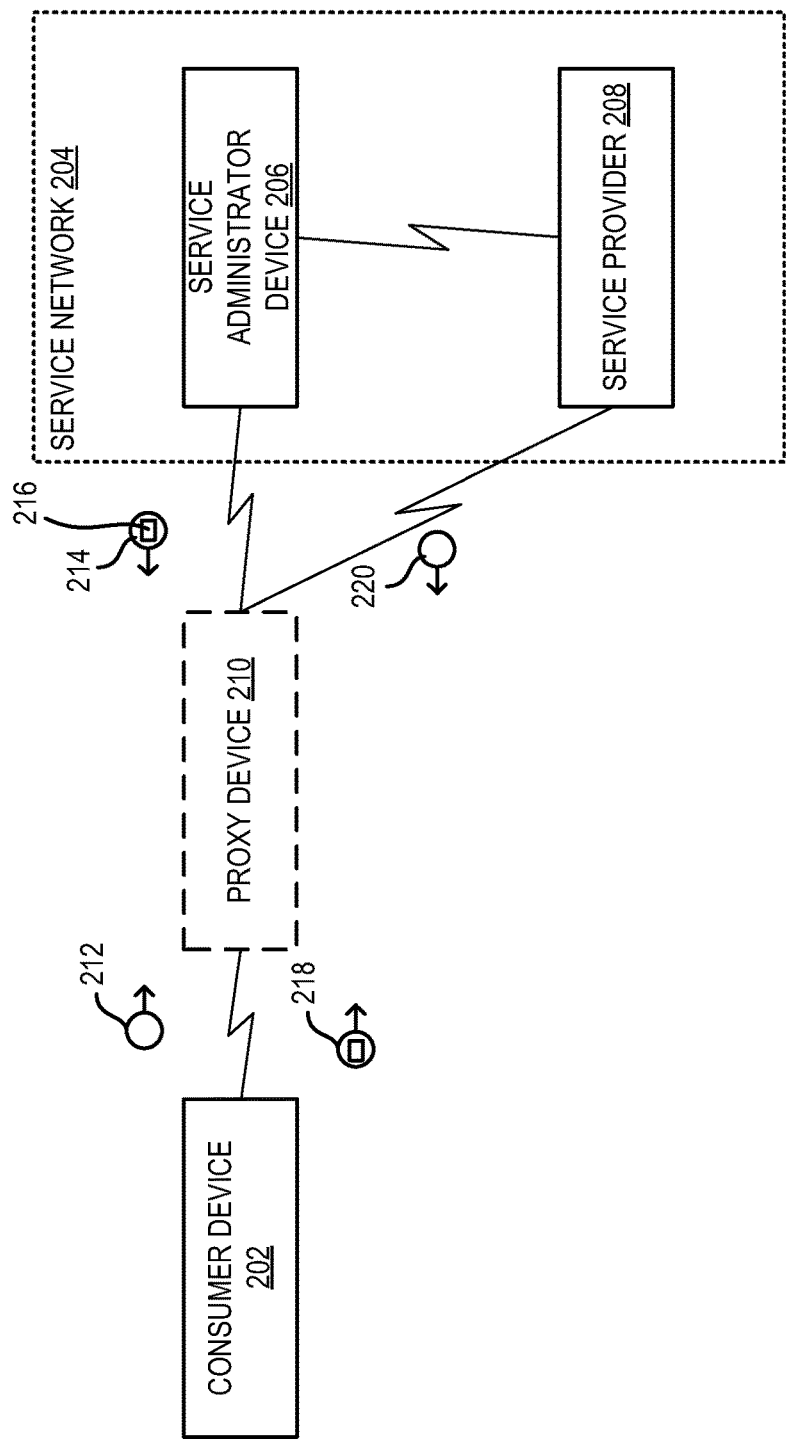
FIG. 2 depicts a high-level service-based architecture (SBA), in embodiments.

FIG. 2 depicts a high-level service-based architecture (SBA) 200, in embodiments. In SBA 200, a consumer device 202 desires to obtain a service provided from one or more components of a service network 204. Herein, "service" may also refer to "content" and vice versa. As such, in SBA 200, a consumer device desires to obtain content provided from one or more components of a content network.

The consumer device 202 may be any device operating accordingly to a wired or wireless protocol. For example, the consumer device 202 may include communications hardware that enables communication with elements of the service network 204 according to the 5G communication protocol. For example, the consumer device 202 may implement a network function such as a software service implemented inside a container, a virtual machine, or a server. In embodiments, the consumer device 202 communicates using a wired network. In additional or alternative embodiments, the communication device communicates using a wireless network. In other words, both the consumer device 202 and the service network 204 may operate according to the 5G communications protocol as defined by the 3GPP technical specifications. In other embodiments, the SBA 200 may implement any data communications protocol between the consumer device 202 and another device, such as a server or other web-based service.

In one embodiment, the service network 204 includes a service administrator device 206, and a service provider 208. In embodiments, the consumer device 202 is a Network Function (NF) device (also referred to as a consumer NF), the service administrator device 206 is an element of the 5G protocol implementing the Network Repository Function (NRF), and the service provider is an element of the 5G protocol implementing the service producer NF (NFP), as understood and defined by (but not limited to) the 3GPP 5G Technical Specifications.

As shown in FIG. 2, in certain embodiments, the consumer device 202 does not directly communicate with the service network 204, but instead communicates with the service network 204 indirectly via one or more proxy devices 210 (only one being shown, but there may be any number of proxy devices).

Aspects of the SBA 200 may be shown as separate devices, but may be implemented on a single device, combination of multiple devices collectively working as a single computational entity (e.g., server), etc. For example, the service administrator device 206 may be integral to, or separate from, the service provider device 208.

To access to the service network 204, the consumer device 202 transmits an access request 212 to the service administrator device 206. The access request 212 includes an assertion of the client credentials associated with the consumer device 202 that are used by the service administrator device 206 to verify the consumer device 202 and grant access to the service network 204. The access request 212 may contain the same information in either direct or indirect communication between the consumer device 202 and the service administrator device 206. The service administrator device 206 may then verify the service request 218, and transmit back an access response 214, which may include an access token. The consumer device 202 then transmits a service request 218 including the assertion of the client credentials and the access token 216 to the service provider 208, which verifies the assertion of the client credentials and the access token 216 and, if verified, provides a service response 220 to the consumer device 202.

Figure 3:
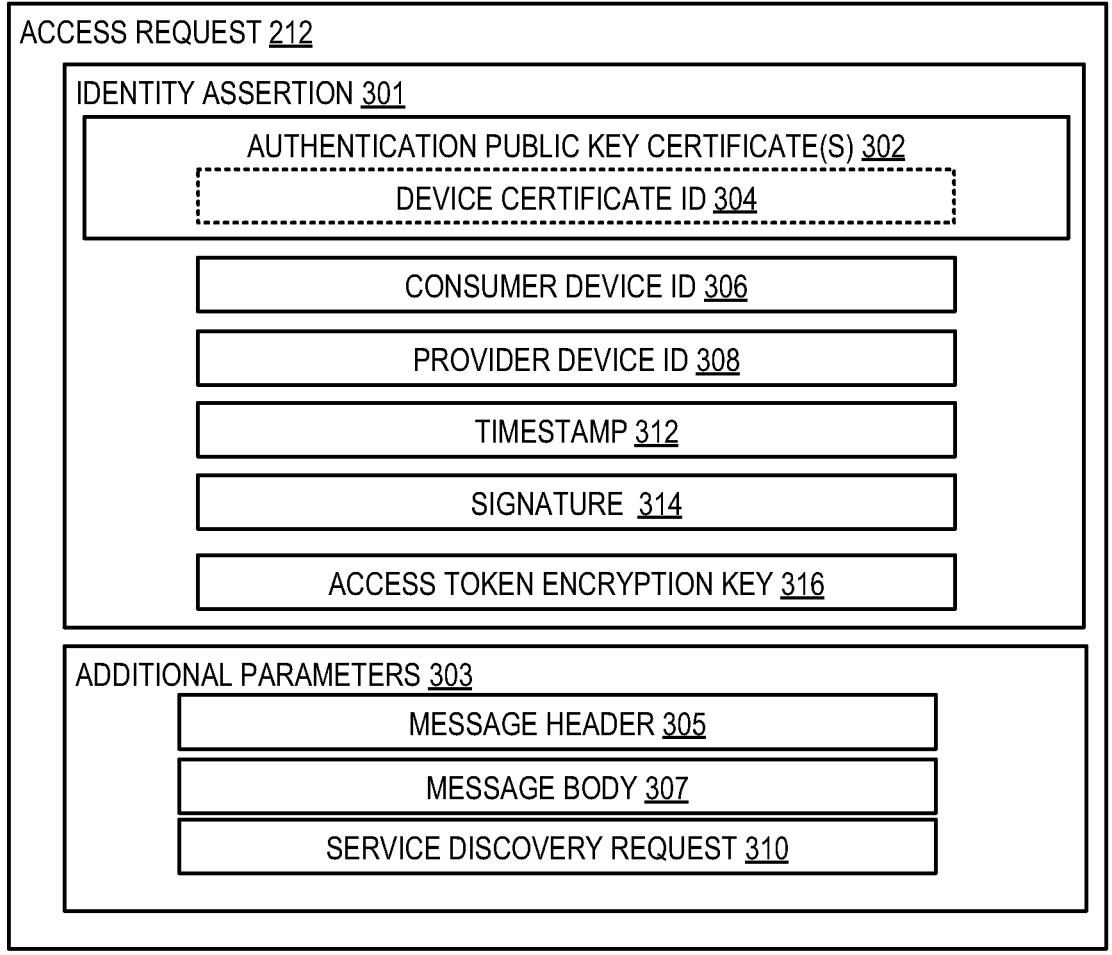
FIG. 3 shows an example access request of FIG. 2, in embodiments.

FIG. 3 shows an example access request 212 of FIG. 2, in embodiments. The access request 212 may include parameters to facilitate the verification of the consumer device 202 and issuance of the access token by the service administration device 206 and/or another device such as the service provider device 208. For example, the access request 212 may include an identity assertion 301 (e.g., a consumer identity assertion, when the access request is generated by the consumer device 202) and other parameters necessary to communicate, such as message headers 305, message body 307, etc. In examples, the identity assertion 301 may be a component of such other parameters, such as a component of the message header 305 and/or message body 307.

For example, the identity assertion 301 may include an authentication public key certificate 302 associated with the consumer device 202. The authentication public key certificate 302 may include the certificate chain where necessary to show chain of trust. The authentication public key certificate 302, may be a Uniform Resource Indicator (URI) pointing to a repository where the actual certificate, and/or certificate chain, resides. The authentication public key certificate 302, in embodiments, may include one or both of the following fields: the X.509 URL (x5u) to refer to a resource for the X.509 public key certificate or certificate chain used for signing the client authentication assertion, or the X.509 Certificate Chain (x5c) include the X.509 public key certificate or certificate chain used for signing the client authentication assertion.

In certain embodiments, identity assertion 301 is a JSON Web Token (JWT). The JWT token represents the credentials used for client authentication of the consumer device 202 in OAuth 2.0. The JWT token may be based on, but is not limited to, one or more of the following Request for Comments (RFC): Section 4.4 ("Client Credentials Grant") of RFC 6749 ("The OAuth 2.0 Authorization Framework"); Section 6.2 ("Client acting on behalf of itself") of RFC 7521 ("Assertion Framework for OAuth 2.0 Client Authentication and Authorization Grants"); RFC 7519 (JSON Web Token (JWT)); RFC 7523 ("JSON Web Token (JWT) Profile for OAuth 2.0 Client Authentication and Authorization Grant"); RFC 7515 ("JSON Web Signature (JWS)). Each of the RFCs referenced in this document are incorporated by reference herein. The following is an example of an authorization public key certificate 302, in the format of a JWT certificate:

POST/token HTTP/1.1
Host: cnf.example.com
Content-Type: application/x-www-form-rulencoded
grant_type=client_credentials&
client_assertion_type-urn: ietf: params: oath: client-assertion-type: jwt-bearer&
client_assertion-[omitted for brevity]

The authentication public key certificate 302 may be associated with a device certificate ID 304 identifying that authentication public key certificate 302 is associated with the consumer device 202. If the authentication public key certificate 302 is associated with another device, such as a proxy device 210, device certificate ID 304 may identify said other device.

The identity assertion 301 may include a consumer device identifier 306 that is a unique ID of the consumer device 202 such as the instance identifier of a NF consumer. The identity assertion 301 may include a provider device ID 308 identifying the service provider 208. In certain embodiments, where the consumer device 202 is unaware of the service provider 208, the provider device ID 308 may identify the service administrator device 206 (e.g., NRF in the 5G communication protocol embodiment). The provider device ID 308 may include a type of desired service provider, such as "NRF" "NF producer", etc. For example, where the consumer device 202 is not authenticated previously by the service administrator device 206, the consumer device 202 may authenticate with the service administrator device 206, receive an access token, and then implement service operations such as service request to NF producer as typically performed as part of the 5G communications protocol. Accordingly, in certain embodiments, where the consumer device 202 is not aware how to communicate with producer device 208, the access request 212 may include a service discover request 310 indicating that the access request 212 is a type of access request where the consumer device 202 desires to know the service producer devices 208 are available (and what service(s) each provides) to the consumer device 202 from the service network 204. The identity assertion 301 may include a timestamp 312 that allows the service administrator device 206 to compare the generation time and/or an expiration time of the identity assertion.

In embodiments, identity assertion 301 includes a signature 314. The signature 314 is digitally signed based on a private key corresponding the authentication public key certificate 302. The signature 314 is associated with all information included in the identity assertion 301 except the signature 314 itself and possible other information (e.g., headers and request parameters) in the access request 212 such that the integrity protected information in the access request 212 may not be intercepted, and then modified (e.g., by changing the timestamp information), by a malicious device. The signature 314 may be based on, but is not limited to, RFC 7515 ("JSON Web Signature (JWS)).

In embodiments, identity assertion 301 further includes an access token encryption key 316. The access token encryption key 316 includes a public key that may be used by the service administration device 206 to encrypt the information in the access response 214 and/or access token 216 therein.

The above discussion of the access request 212 utilizes a public/private key pair authentication protocol. However, it should be appreciated that other authentication/encryption algorithms may be used without departing from the scope hereof. For example, the access request 212 may be based on a symmetric-key algorithm without departing from the scope hereof. In embodiments, the signature 314 may be a message authentication code (MAC) generated using a shared key between the consumer device and the intended recipient of the identity assertion.

The identity assertion 301 may include any combination of the shown features in FIG. 3, as well as other information without departing from the scope hereof. In one specific embodiment, the identity assertion 301 includes the combination of: the authentication public key certificate 302 (or certificate chain where necessary), the consumer device ID 306, the timestamp 312, and the signature 314 (which is based from the consumer device private key 306 associated with the authentication public key certificate 302). In such embodiment, the identity assertion 301 may be based on a JWT token. Moreover, pieces of individual information may be included in the bounds of the identity assertion 301, or located elsewhere. In other words, portions of the identity assertion 301 may be distributed throughout the signal, or message, encompassing the identity assertion 301 without departing from the scope hereof. The identity assertion 301 may be a subsequent string of information (e.g., located in a message header, or a message body), in certain embodiments. However, the identity assertion 301 need not be a subsequent string of information, in other embodiments, where portions of the identity assertion 301 are a part of the message header, and portions of the identity assertion 301 are part of the message body. Additional examples of specific access requests 212 are discussed below with respect to FIGS. 7-13.

In certain embodiments, the access request 212 (or the service request 218) occurs after a consumer device 202 or proxy device 210 therefore already has an access token 216. In such embodiments, any of the access request 212 and service request 218 may include the any combination of the information discussed with respect to FIG. 3, as well as an access token 216. Accordingly, the identity assertion 301 may be included in any communication 212, 214, 218, and/or 220 discussed herein so that a device may identify itself, and be authenticated via information within said communication, such as based on the information within the identity assertion 301.

In embodiments including indirect communication, each proxy device 210 may relay the access request 212. In each instance of relay (e.g., by each proxy device 210), the proxy device may add, remove, and/or substitute information within the access request 212 to allow the proxy device 210 to be verified. For example, the proxy device 210 "closest" (e.g., in direct communication) with the consumer device 202 may replace the authentication public key certificate 302 with an authentication certificate associated with said closest proxy device 210. This allows the proxy device 210 to be authenticated with the service administration device 206. However, in such embodiments, the access request relayed by the proxy device(s) 210 may still include the consumer device identifier 308 such that the granted access token 216 may be associated by the service administration device 206 so that the consumer device 202 may receive service from the service provider 208.

In certain embodiments, to utilize a proxy device 210, the consumer device 202 may transmit the access request 212 including only the desired service network 204 ID, and a consumer device ID (e.g., consumer device ID 308) discussed above. The proxy device 210 may then add necessary additional information to complete a necessary consumer identity assertion 301, such as the authentication certificate 302. In such embodiments, the proxy device 210 operates equivalent as the consumer device 202.

The access response 214 includes the access token 216. In embodiments, the access response 214 is an encrypted message. For example, the access response 214 is encrypted using the encryption key 316.

The service request 218 includes the access token 216. It may also include the unique identifier of the consumer device 202 used to verify the access token 216. Where the service provider device 208 is already authenticated with the consumer device 202 (or no authentication between the service provider device 208 and the consumer device 202 is necessary), the access token 216 alone may be enough to allow interaction between the service provider device 208 and the consumer device 202. However, the consumer device 202 and the service provider device 208 may also require to authenticate with each other. In such embodiments, each of the consumer device 202 and the service provider device 208 may transmit to each other individual access codes used to authenticate each other. Alternatively, the access token 216 may be verified by the service provider device 208, which may transmit the service response 220 including the necessary service, as well as an authentication token of the service provider device 208 that the consumer device 202 uses to authenticate the service provider device 208.

In embodiments, the access token 216 includes a hash of the authorization public key certificate 302 received in the access request. In embodiments where the authorization public key certificate 302 is a URI, the access token 216 includes a hash of the URI. In any embodiment, the access token 216 may additionally include the consumer device ID 308. In an embodiment, the access token 216 is a bearer token. The bearer token may be used by any entity. In embodiments, the access token 216 is a holder-of-key token that requires the presenter to demonstrate possession of a key associated with the token (e.g., the presenter of the token must be authenticated by the receiver of the token).

Thus, the access token 216 may be encrypted using the public key associated with authentication public key certificate 302 which may be decrypted using the corresponding private key by the consumer device 202. Alternatively, if the access token 216 is to be used by a proxy device 210 on behalf of the consumer device 202, then the access token 216 may be encrypted using the public key associated with the authentication certificate of the representing proxy device 210.

As discussed above, the access request 212 may include an access token encryption key 316. In such embodiments, the access token 216 and/or access response 214 may be encrypted using such access token encryption key 316.

The encryption of the access token 216 by the service administration device 206 ensures that it is always used first by the requesting consumer device 202 (or representative proxy device 210) as, without encryption, a compromised proxy device would be able to intercept the access token 216 in the access response message 214 and impersonate the requesting consumer device.

Figure 4:
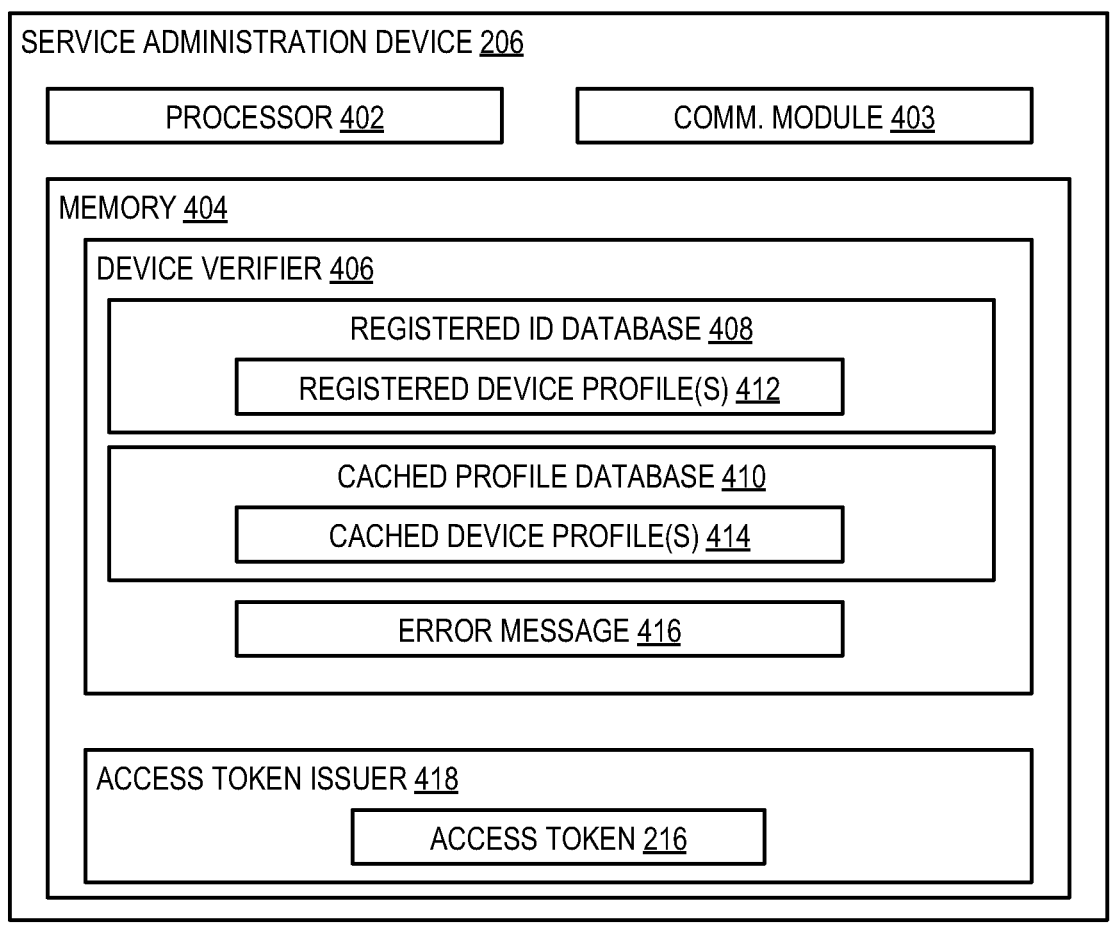
FIG. 4 depicts a block diagram of the service administration device of FIG. 2, in embodiments.

FIG. 4 depicts a block diagram of the service administration device 206 of FIG. 2, in embodiments. The service administration device 206 may include a processor 402 in operative communication with memory 404. The processor 402 includes computing hardware capable of executing non-transitory computer readable instructions. For example, the processor 402 may be any one or more of a general-purpose computer, a digital signal processor, central processing unit (CPU), field-programmable gate array (FPGA), system-on-chip (SoC), or another type of integrated circuit capable of performing logic, control, and input/output operations. Memory 404 includes, but is not limited to, a computer-readable medium, such as a random-access memory (RAM), and a computer-readable non-volatile medium, such as flash memory. Additionally, or alternatively, any other type of memory may be utilized without departing from the scope hereof.

The consumer device 202 further includes a communications module 403 which includes any hardware and firmware necessary to communicate with one or more other devices in SBA 200 discussed above, such as the service administration device 206, the service provider device 208, and one or more proxy devices 210. In embodiments, the communications module 403 may implement wired communications. In additional or alternative embodiments, the communications module 403 may implement wireless communications. The communications module 1403 may operate according to 5G communications protocol as defined by 3GPP.

Memory 404 includes device verifier 406 as non-transitory computer readable instructions that, when executed by the processor 402, cause the processor 402 to implement the functionality of the device verifier 406 discussed herein. To validate the consumer device 202 and provide an access token 216 in response to an access request 212, the device verifier 406 analyzes the data included in the access request 212. For example, the device verifier 406 may validate the authentication public key certificate included in the access request, validate the digital signature included in the access request, validating the unique identity of the second device in the access request against the identity in the authentication public key certificate. The authentication public key certificate 302 may either include the consumer device certificate ID 304, or not. In situations where the consumer device certificate ID 304 is included, then the device verifier 406 may compare the consumer device certificate ID 304 and the consumer device ID 306 and, if they match, verify the consumer device 202 transmitting the access request 212.

Where the consumer device certificate ID 304 is not included, the device verifier 406 may determine if the consumer device 202 transmitting the access request 212 is registered in a registered ID database 408 or a cached profile database 410. The registered ID database 408 includes a list of registered device profile(s) 412 of consumer device(s) that have previously authenticated and registered with the service administration device 206. The cached profile database 410 includes a list of cached device profile(s) 414 of consumer device(s) that have previously contacted the service administration device 206 but have not officially registered and been stored as a registered device profile 412.

If the consumer device ID 308 matches one of the registered device profiles 412, then the device verifier 406 may compare additional information in the access request 212 and if all compared data matches the registered device profile 412, the device verifier 406 may verify the consumer device 202 and access request 212.

If the consumer device ID 308 matches one of the cached device profiles 414, then the device verifier 406 may compare additional information in the access request 212 and, if all compared data matches the cached device profile 414, the device verifier 406 may verify the consumer device 202 and access request 212. Importantly, the device verifier 406 does not verify solely based on the consumer device ID 308 in the access request 212, but compares some or all of the other information in the access request 212 to the associated cached device profile 414.

If the consumer device ID 308 does not match either the registered device profiles 412 or the cached device profiles 414, then the device verifier 406 may allow access to the network 204 based on first-use, and create a new cached device profile 414 for the consumer device 202 transmitting the access request 212 that does not match either the registered device profiles 412 or the cached device profiles 414. The cached device profiles 414 may be deleted periodically, or may be stored in perpetuity.

If the device verifier 406 cannot verify the consumer device 202 or the access request 212, the device verifier may transmit an error message 416 to the consumer device 202.

Figure 5:
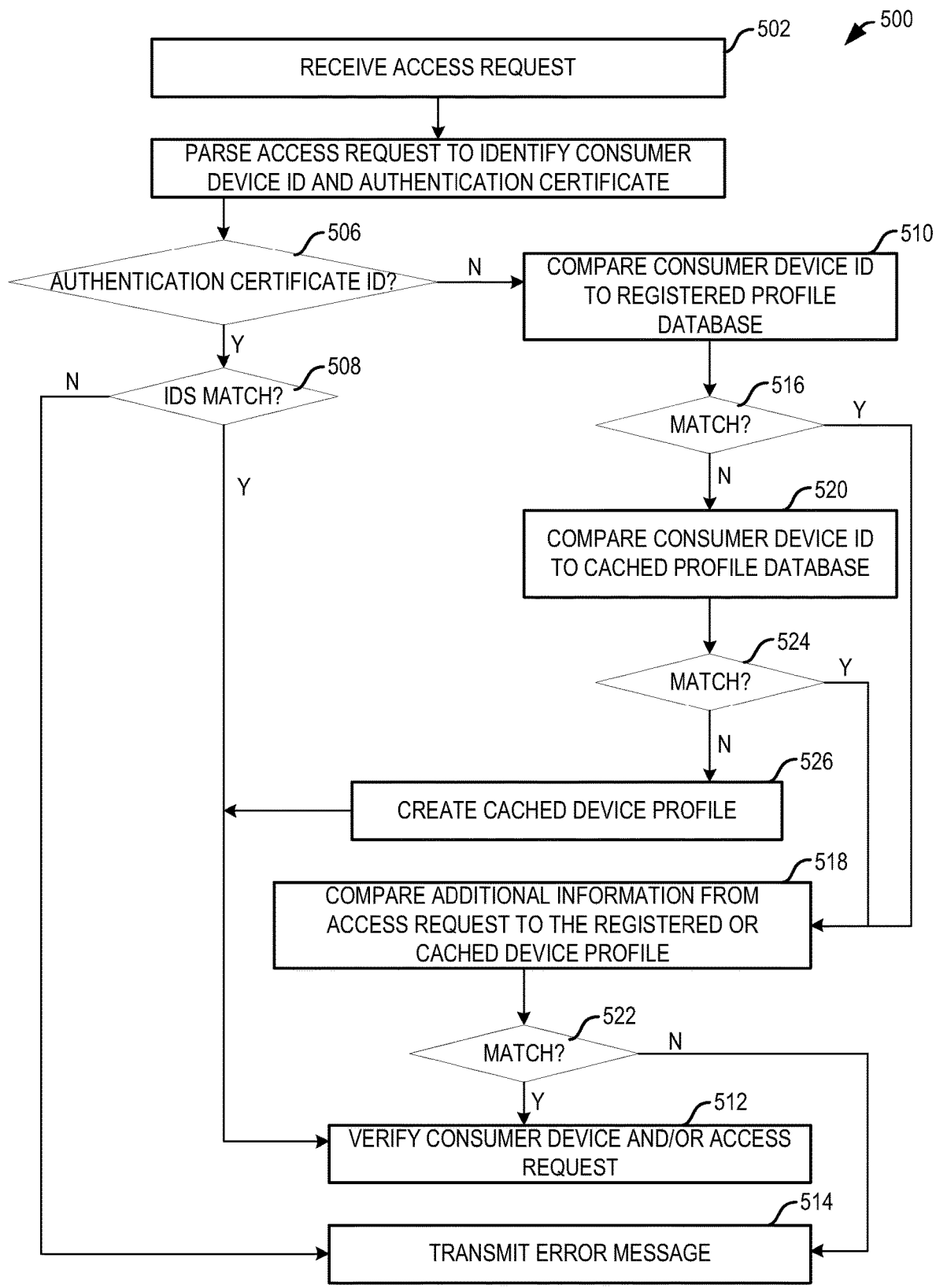
FIG. 5 depicts an example method for verifying a device transmitting an access request of FIG. 2, in embodiments.

FIG. 5 depicts an example method 500 for verifying a device transmitting an access request 212 of FIG. 2, in embodiments. Method 500 may be implemented by the device verifier 406 discussed above.

In block 502, the method 500 receives an access request. In one example of operation of block 502, the service administration device 206 (or service producer device 208) receives the access request 212 that includes any combination of the above-discussed information in FIG. 3, such as the identity assertion 301.

In block 504, the method 500 parses the received access request to identify consumer device ID and an authentication certificate and associated, and, if necessary, any other necessary information within the access request received in block 502. In one example of operation of block 504, the device verifier 406 parses the received access request 212 to identify the consumer device ID 306 and the consumer device certificate ID 304, if included.

Block 506 is a decision. If, in block 504, the consumer device certificate ID is not parsed because it is not available (e.g., not included) in the access request, method 500 proceeds to block 508. Else, method 500 proceeds to block 510.

Block 508 is a decision. If the consumer device ID matches the authentication certificate ID, then the method proceeds to block 512 and verifies the consumer device and/or the access request. Else, the method 500 proceeds with block 514 and transmits an error message to the consumer device 202 transmitting the access request 212. In one embodiment of block 508 and 512, if the consumer device ID 308 matches the consumer device certificate ID 304, then the device verifier 406 verifies the consumer device 202 and/or the access request 212. In one example of blocks 508 and 514, if the consumer device ID 308 does not match the consumer device certificate ID 304, then the device verifier 406 does not verify the consumer device 202 and/or the access request 212, and transmits error message 416 to the consumer device.

In block 510, the method 500 compares the parsed consumer device ID to a registered profile database. In one example of block 510, the device verifier 406 compares the consumer device ID 308 to the registered device profiles 412 in the registered device database 408. Block 516 is a decision, if there is a match between the consumer device ID 308 and one of the registered device profiles 412, the method proceeds to block 518 and compares the additional parsed data to the matched registered device profile 412. If there is not a match, method 500 proceeds to block 520.

In block 518 stemming from block 516, the method 500 compares additional information parsed from the access request in block 504 to the registered device profile. If all necessary information matches, as determined in block 522, then method proceeds to block 512 as discussed above, else method proceeds to block 514 as discussed above.

In block 520, the method 500 compares the parsed consumer device ID to a cached profile database. In one example of block 510, the device verifier 406 compares the consumer device ID 308 to the cached device profiles 414 in the cached profile database 410. Block 524 is a decision, if there is a match between the consumer device ID 308 and one of the cached device profiles 414, the method proceeds to block 518 and, in the iteration of block 518 stemming from block 524 compares the additional parsed data to the matched cached device profile 414. If there is not a match, method 500 proceeds to block 526. In block 526, the method creates a cached device profile under the principle of first-use trust. In one example of block 526, the device verifier 406 creates a new cached device profile 414 in the cached profile database 410. After block 526, method 500 performs block 512 as discussed above.

Referring back to FIG. 4, memory 404 includes an access token issuer 418 as non-transitory computer readable instructions that, when executed by the processor 402, cause the processor 402 to implement the functionality of the access token issuer 418 discussed herein. In response to the requesting device (e.g., the consumer device 202 and/or the proxy device 210) transmitting the access request 212 to the service administration device 206 and being verified by the device verifier 406, the access token issuer 418 may generate access response 214 and in particular the access token 216. The access token issuer 418 may encrypt the access token 216 and/or the access response 214 using the consumer device certificate ID 304, if included. Alternatively, in embodiments including the access token encryption key 316, the access token issuer 418 may encrypt the access token 216 and/or the access response 214 using the access token encryption key 316.

Figure 6:
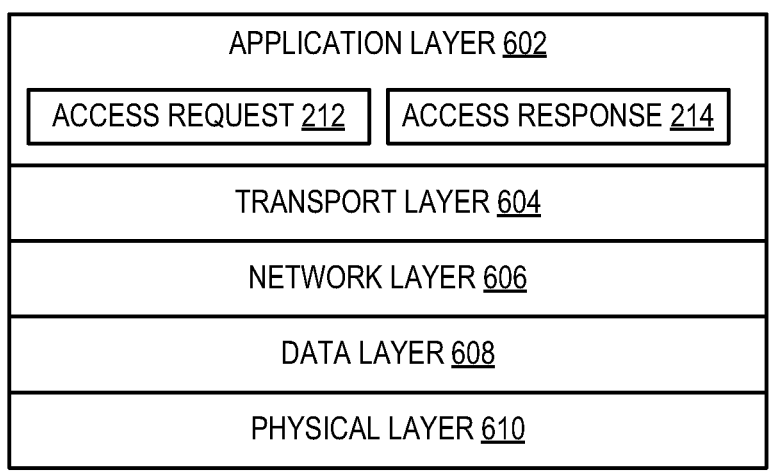
FIG. 6 discloses an example protocol stack for use in the SBA, of FIG. 2.

FIG. 6 discloses an example protocol stack 600 for use in the SBA 200, of FIG. 2. Protocol stack 600 includes an application layer 602, transport layer 604, network layer 606, datalink layer 608, and physical layer 610. There may be more or fewer layers without departing from the scope hereof. The application layer 602 operates as the messaging layer between two devices, such as between the consumer device 202 and the service administration device 206 (and any proxy devices 210 therebetween). In an embodiment, the application layer 602 is an HTTP-protocol based layer. The transport layer 604 is a security layer to ensure communication security between the two devices using the application layer (and other layers within the protocol stack 600). In embodiments the transport layer 604 includes one or both of a TLS layer and a TCP layer. The network layer 606 is a group of methods, protocols, and specifications used to organize and control transportation of network packets from one device to another. The datalink layer 608 (known in the art as L2) is used for the encoding, decoding and logical organization of data bits. The physical layer 610 (known in the art as L1), addresses with bit-level transmission between different devices and supports electrical or mechanical interfaces connecting to the physical medium for synchronized communication. The layers of the protocol stack may vary depending on the particular requirements of the service based network 204.

In known HTTP over TLS communication protocol, each device must establish TLS authentication with its neighboring device. In an example of direct communication situations where, for example, the consumer device 202 communicates directly with the service administration device 206, a single TLS authentication session may be established. However, in the example of indirect communication situations FIG. 2, the consumer device 202 must establish a first TLS connection with the proxy device 210, and the proxy device 210 must establish a second TLS connection with the service administration device 206 (and possibly a third TLS connection with the service producer device 208). These multiple TLS connections may be burdensome and, in some cases not attainable such as in certain instances of indirect communication situations in the 5G SBA architecture. It is equally undesirable to have different communication protocols for direct versus indirect communication situations. Therefore, the present disclosure may embed the access request 212 and the access response 214 in the application layer 602, as shown in FIG. 6. Because the access request 212 includes the above-described authentication information, this allows the two devices to authenticate one another without requiring the establishment of the security protocol requirements in the transport layer. It should be appreciated that the embedded access request 212 may be in addition to security protocol of the transport layer 604, or may replace the security protocol of the transport layer 604. Accordingly, the access requests 212 may be relayed (either in exact form or modified based on one or more proxy device information as discussed above) in the application layer thereby eliminating the need for multiple TLS authentication sessions to be established between each neighboring device, providing additional level of authentication security over the transport-layer authentication, and/or providing an alternative level of authentication security when the transport-layer authentication is unavailable (e.g., in certain instances of indirect communication).

Figure 7:
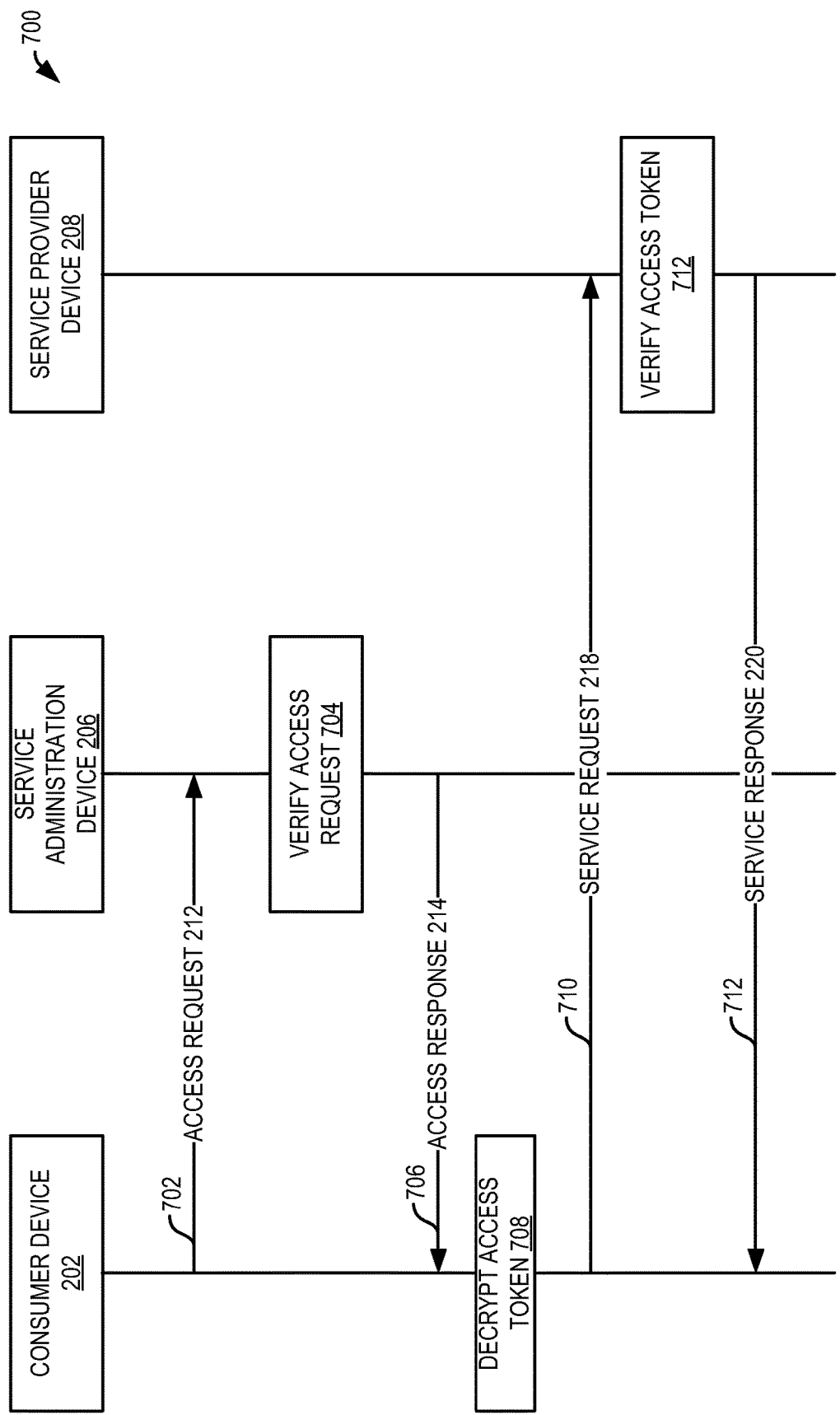
FIG. 7 depicts a flow diagram of verification of a consumer device to use services provided by the service-based architecture via direct communication with the service administration device of FIG. 2, in embodiments.

FIG. 7 depicts a flow diagram 700 of verification of a consumer device 202 to use services provided by the service-based architecture via direct communication with the service administration device 206. In step 702, the consumer device 202 transmits, and the service administrator device 206 receives, access request 212 including any combination of the components of the identity assertion 301, and additional parameters 303 discussed above with respect to FIG. 3.

In step 704, the service administrator device 206 verifies the access request and particularly the identity assertion received in step 702 according to method 500 discussed above.

In step 706, the service administrator device 206 transmits an access response 214 including an access token 216 as discussed above. The access response 214 and access token 216 may be encrypted in any manner as discussed above. If encrypted, the flow 700 may include step 708 in which the consumer device 202 decrypts the access response 214 and/or the access token 216 in the access response 214.

In step 710, the consumer device 202 transmits, and the service provider device 208 receives, the service request 218, including the access token received by the consumer device 202 from the service administrator device 206.

In step 712, the service provider device 208 verifies the access token according to known access token verification procedures. For example, the service provider device 208 may compare the access token information, and associated identity therein, to the device ID in the identity assertion included in the service request 218 (and any other necessary information such as timestamp information, etc.), and if there is a match, verify the device transmitting the service request.

In step 714, if verified, the service provider device 208 transmits a service response 220 to the consumer device 202.

Any one or more of the steps of flow 700 may be implemented via the application on the application layer 602 of the protocol stack 600 as discussed above. For example, the access requests and/or the access tokens discussed above may be embedded in an HTTP header layer, or an HTTP message body within the application layer 602.

Figure 8:
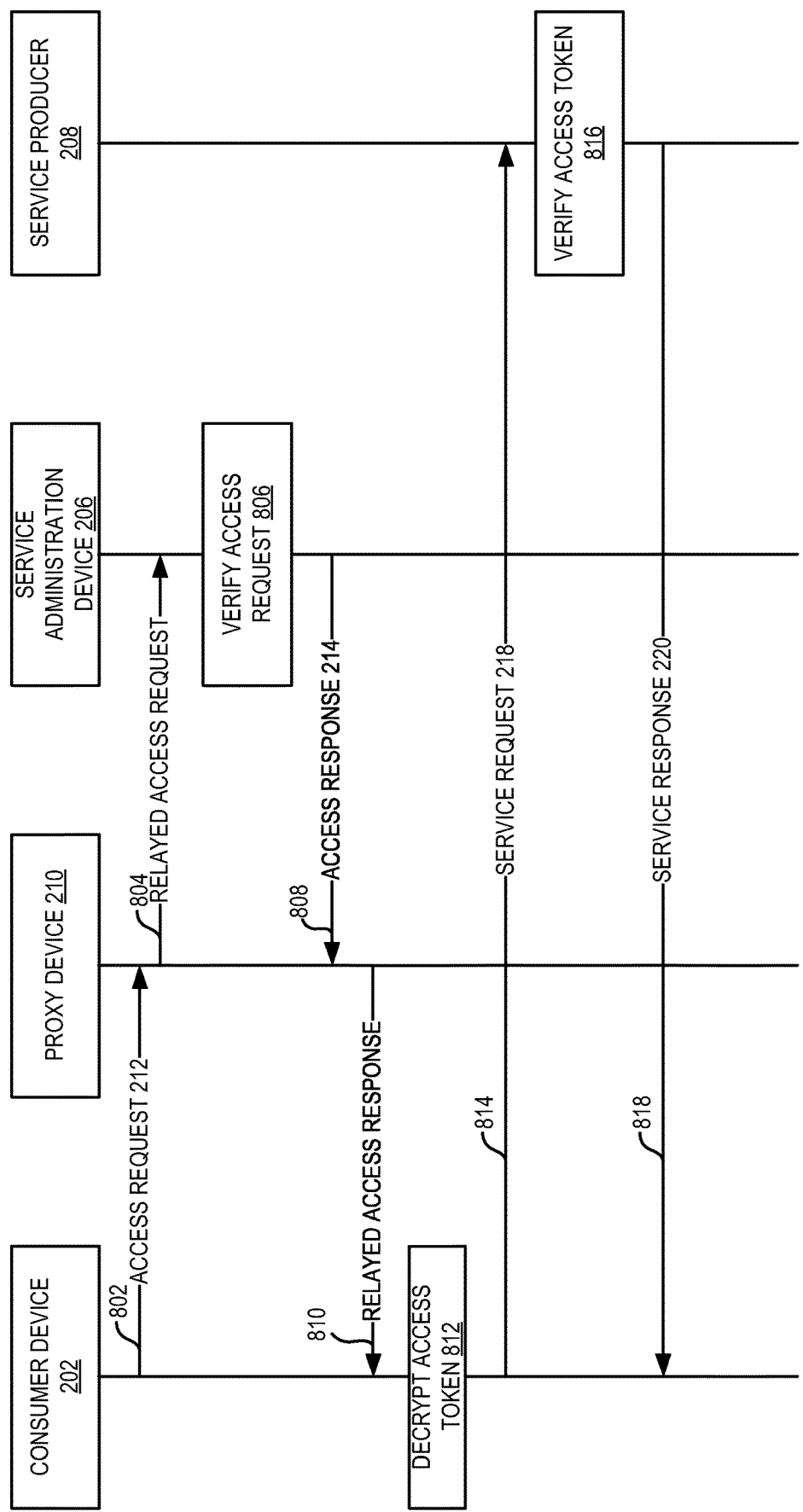
FIG. 8 depicts a flow diagram of verification of a consumer device to use services provided by the service-based architecture via indirect communication with the service administration device through one or more proxy devices, in embodiments.

FIG. 8 depicts a flow diagram 800 of verification of a consumer device 202 to use services provided by the service-based architecture via indirect communication with the service administration device 206 through one or more proxy devices 210. Only one proxy device 210 is shown, but there may be any number of proxy devices 210 without departing from the scope hereof.

In step 802, the consumer device 202 transmits, and the proxy device 210 receives, access request 212 including any combination of the components of the identity assertion 301, and additional parameters 303 discussed above with respect to FIG. 3.

In step 804, the proxy device 210 relays the received access request, or a subset of components thereof such as the identity assertion 301, to the service administrator device 206. Step 804 may include as many relays necessary depending on the number of proxy devices 210 between the consumer device 202 and the service administrator device 206.

In block 806, the service administrator device 206 verifies the relayed access request from block 804 according to method 500 discussed above.

In step 808, the service administrator device 206 transmits an access response 214 including an access token 216 as discussed above to the proxy device 210. The access response 214 and access token 216 may be encrypted in any manner as discussed above.

In step 810, the proxy device 210 relays the received access response to the consumer device 202. Step 810 may include as many relays necessary depending on the number of proxy devices 210 between the consumer device 202 and the service administrator device 206. If encrypted, the flow 800 may include step 812 in which the consumer device 202 decrypts the access response 214 and/or the access token 216 in the relayed access response.

In step 814, the consumer device 202 transmits, and the service provider device 208 receives, the service request 218, including the access token received by the consumer device 202 from the service administrator device 206 as relayed by the proxy device(s) 210.

In step 816, the service provider device 208 verifies the access token according to known access token verification procedure. For example, the service provider device 208 may compare the access token information, and associated identity therein, to the device ID in the identity assertion included in the service request 218 (and any other necessary information such as timestamp information, etc.), and if there is a match, verify the device transmitting the service request.

In step 818, if verified, the service provider device 208 transmits a service response 220 to the consumer device 202.

Any one or more of the steps of flow 800 may be implemented via the application on the application layer 602 of the protocol stack 600 as discussed above. For example, the access requests and/or the access tokens discussed above may be embedded in an HTTP header layer, or an HTTP message body within the application layer 602.

Figure 9:
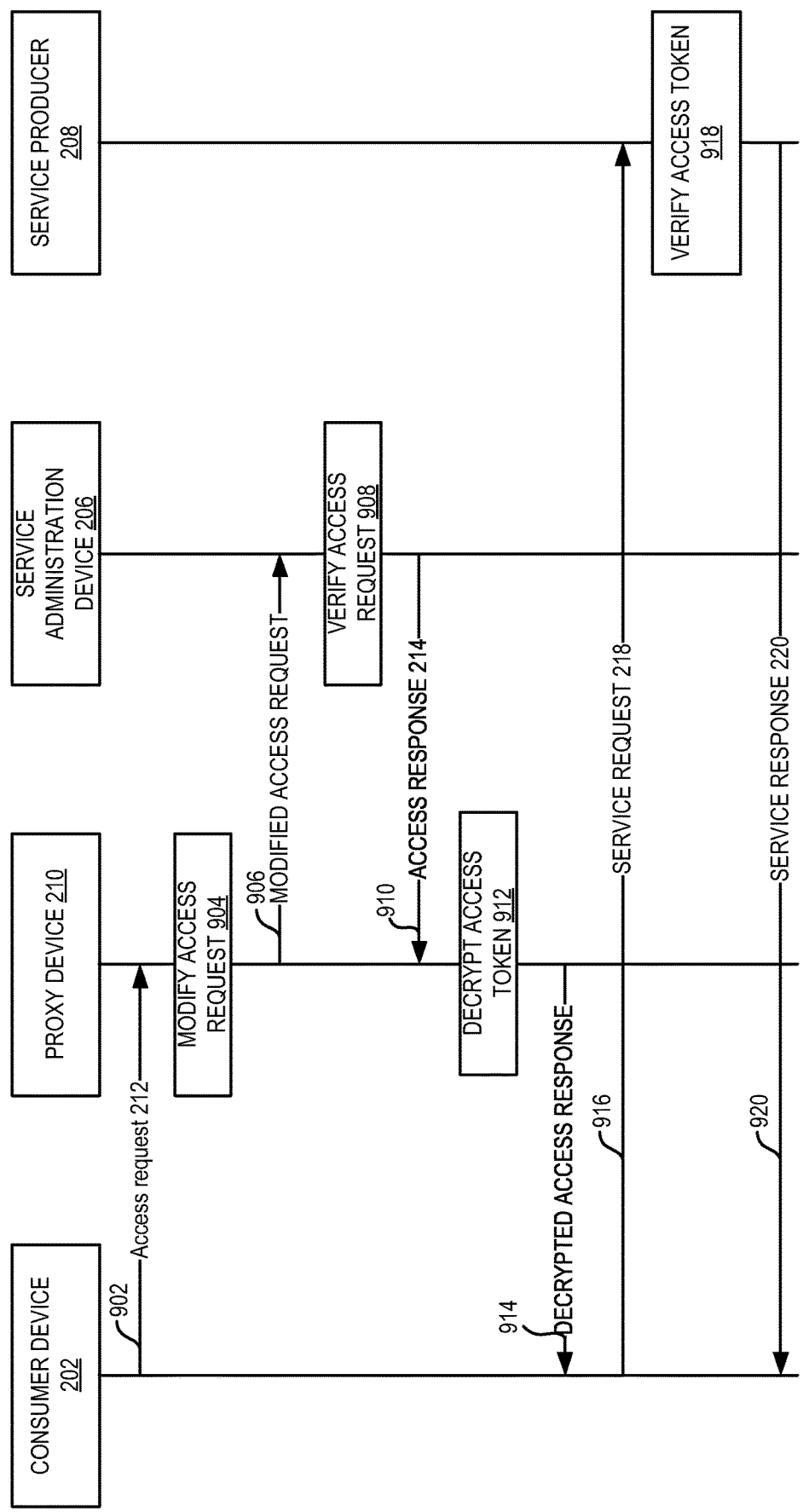
FIG. 9 depicts a flow diagram of verification of a consumer device to use services provided by the service-based architecture via indirect communication with the service administration device through one or more proxy devices, in embodiments.

FIG. 9 depicts a flow diagram 900 of verification of a consumer device 202 to use services provided by the service-based architecture via indirect communication with the service administration device 206 through one or more proxy devices 210. Only one proxy device 210 is shown, but there may be any number of proxy devices 210 without departing from the scope hereof. In contrast to flow 800, in flow 900, at least one of the proxy device(s) 210 modify the access request, or the identity assertion 301, received at the proxy device 210 from the consumer device 202 (or an intermediate proxy device therebetween).

In step 902, the consumer device 202 transmits, and the proxy device 210 receives, access request 212 as discussed above. In the particular embodiment of flow 900, the transmitted access request may include any combination of the above-discussed components of the access request 212. In one particular embodiment, the transmitted access request in step 902 does not include an authentication certificate.

In step 904, the proxy device 210 modifies the received access request, or identity assertion 301 included therein, to include the necessary information for the proxy device 210 to be verified by the service administrator device 206. As such, the authentication and access of the consumer device 202 to the service network 204 may be "delegated" to the proxy device 210. For example, the proxy device 210 may modify the received access request and/or identity assertion to either add, or replace, the access request with another identity assertion including an authentication public key certificate (similar to the certificate 302 discussed above) associated with the proxy device 210. Even in the delegated embodiments, however, the modified access request (that is then transmitted in step 906 as discussed below) includes the consumer device ID 308 such that the granted access token (as discussed in blocks 908 and 910) may be associated with the consumer device 202 and the service provider device 208 knows where to send the service response 220.

In step 906, the proxy device 210 transmits the modified access request and/or identity assertion to the service administrator device 206.

In block 908, the service administrator device 206 verifies the modified access request and/or identity assertion from block 906 according to method 500 discussed above.

In step 910, the service administrator device 206 transmits an access response 214 including an access token 216 as discussed above to the proxy device 210. The access response 214 and access token 216 may be encrypted in any manner as discussed above. In particular, the modified access request in block 906 may include an encryption key (e.g., the encryption key 316) added by the proxy device 210. In such embodiments, the access response 214 and/or the access token 216 may be encrypted based on the encryption key 316.

In step 912, if the access response 214 and/or the access token 216 therein are encrypted, the proxy device 210 decrypts the access response 214 and/or the access token 216 in the access response.

In step 914, the proxy device 210 relays the access response 214 or the access token 216 (either in decrypted format or decrypted if step 912 is implemented) to the consumer device 202.

In step 916, the consumer device 202 transmits, and the service provider device 208 receives, the service request 218, including the access token received by the consumer device 202 from the proxy device(s) 210. In embodiments, the service request 218 may further include another iteration of the identity assertion 301, or any other information discussed above with respect to access request 212 where additional verification of the device transmitting the service request 218 is desired.

In step 918, the service provider device 208 verifies the access token according to known access token verification procedure. For example, the service provider device 208 may compare the access token information, and associated identity therein, to the device ID in the identity assertion included in the service request 218 (and any other necessary information such as timestamp information, etc.), and if there is a match, verify the device transmitting the service request.

In step 920, if verified, the service provider device 208 transmits a service response 220 to the consumer device 202.

Any one or more of the steps of flow 900 may be implemented via the application on the application layer 602 of the protocol stack 600 as discussed above. For example, the access requests and/or the access tokens discussed above may be embedded in an HTTP header layer, or an HTTP message body within the application layer 602.

Figure 10:
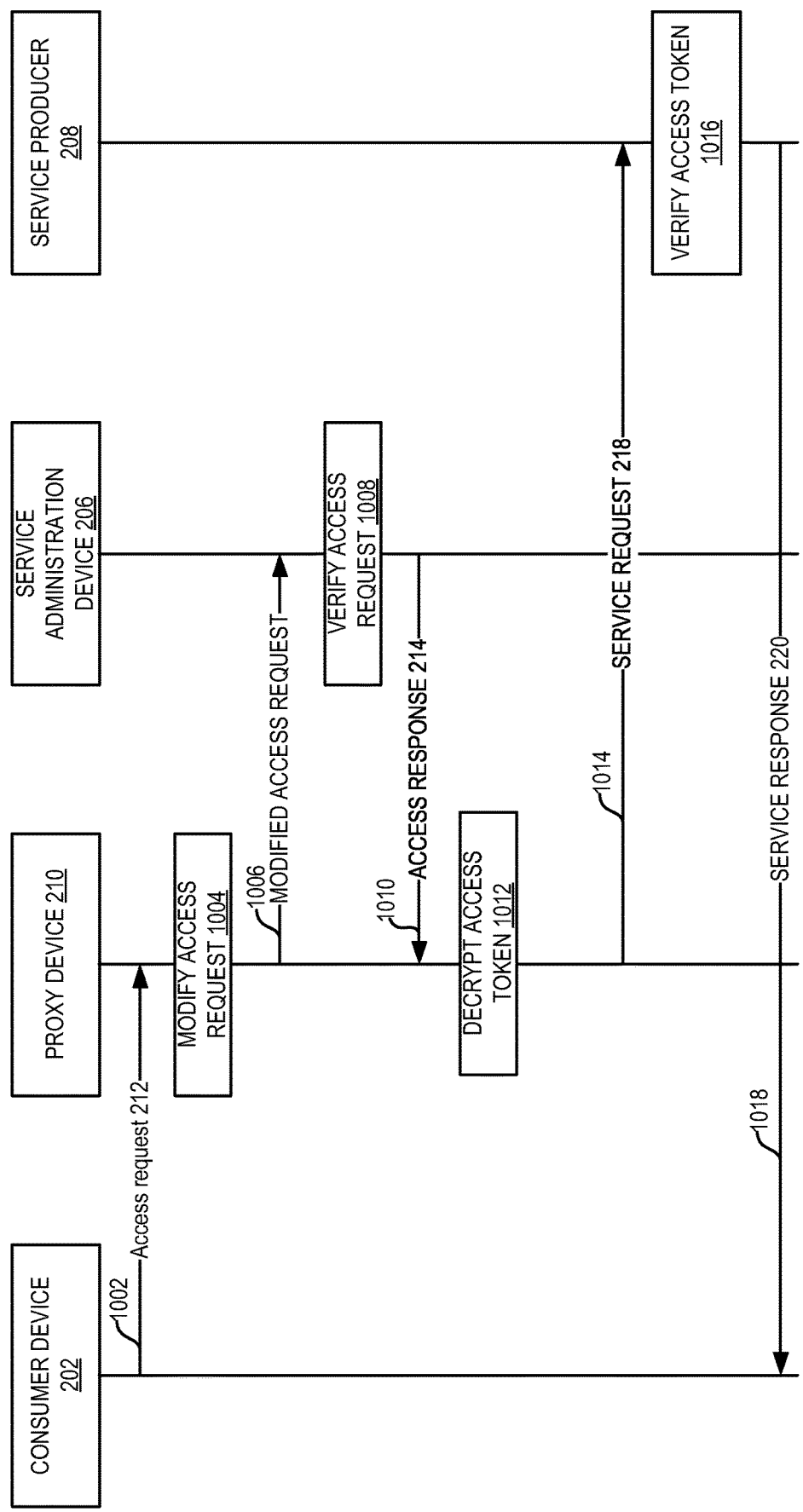
FIG. 10 depicts a flow diagram of verification of a consumer device to use services provided by the service-based architecture via indirect communication with the service administration device through one or more proxy devices, in embodiments.

FIG. 10 depicts a flow diagram 1000 of verification of a consumer device 202 to use services provided by the service-based architecture via indirect communication with the service administration device 206 through one or more proxy devices 210. Only one proxy device 210 is shown, but there may be any number of proxy devices 210 without departing from the scope hereof. In contrast to flow 900, in flow 1000, in addition to the at least one of the proxy device(s) 210 modifying the access request and/or identity assertion received at the proxy device 210 from the consumer device 202 (or an intermediate proxy device therebetween), the proxy device(s) 210 are also delegated the functionality of initiating the service request 218 on behalf of the consumer device 202.

In step 1000, the consumer device 202 transmits, and the proxy device 210 receives, access request 212 as discussed above. In the particular embodiment of flow 1000, the transmitted access request may include any combination of the above-discussed components of the access request 212. In one particular embodiment, the transmitted access request in step 1002 does not include an authentication certificate, as the required authentication certificate is added in block 1004 by the proxy device 210.

In step 1004, the proxy device 210 modifies the received access request, and/or identity assertion therein, to include the necessary information for the proxy device 210 (and in turn the consumer device 202) to be verified by the service administrator device 206. As such, the authentication and access of the consumer device 202 to the service network 204 may be "delegated" to the proxy device 210. For example, the proxy device 210 may modify the received access request and/or identity assertion to either add, or replace, the access request with an authentication public key certificate (similar to the certificate 302 discussed above) associated with the proxy device 210. Even in the delegated embodiments, however, the modified access request (that is then transmitted in step 1006 as discussed below) includes the consumer device ID 308 such that the granted access token (as discussed in blocks 1008 and 1010) may be associated with the consumer device 202 and the service provider device 208 knows where to send the service response 220.

In step 1006, the proxy device 210 transmits the modified access request and/or identity assertion to the service administrator device 206.

In block 1008, the service administrator device 206 verifies the modified access request and/or identity assertion from block 1006 according to method 500 discussed above.

In step 1010, the service administrator device 206 transmits an access response 214 including an access token 216 as discussed above to the proxy device 210. The access response 214 and access token 216 may be encrypted in any manner as discussed above. In particular, the modified access request in step 1006 may include an encryption key (e.g., the encryption key 316) added by the proxy device 210. In such embodiments, the access response 214 and/or the access token 216 may be encrypted based on the encryption key 316.

In step 1012, if the access response 214 and/or the access token 216 therein are encrypted, the proxy device 210 decrypts the access response 214 and/or the access token 216 in the access response.

In step 1014, the proxy device 210 transmits, and the service provider device 208 receives, the service request 218, including the access token received by the proxy device(s) 210. The service request transmitted by the proxy device 210 may include an ID (e.g., ID 308) for one or both of the proxy device 210 and the consumer device 202 such that the service provider device 208 may one or both of (1) authenticate and verify the device transmitting the service request 218 (e.g., the proxy device 210), and (2) the device which will receive the service response 220 (e.g., the consumer device 202). In embodiments, the service request 218 may further include another iteration of the identity assertion 301, or any other information discussed above with respect to access request 212 where additional verification of the device transmitting the service request 218 is desired.

In step 1016, the service provider device 208 verifies the access token according to known access token verification procedure. For example, the service provider device 208 may compare the access token information, and associated identity therein, to the device ID included in the service request 218 (and any other necessary information such as timestamp information, etc.), and if there is a match, verify the device transmitting the service request.

In step 1018, if verified, the service provider device 208 transmits a service response 220 to the consumer device 202.

Any one or more of the steps of flow 1000 may be implemented via the application on the application layer 602 of the protocol stack 600 as discussed above. For example, the access requests and/or the access tokens discussed above may be embedded in an HTTP header layer, or an HTTP message body within the application layer 602.

Figure 11:
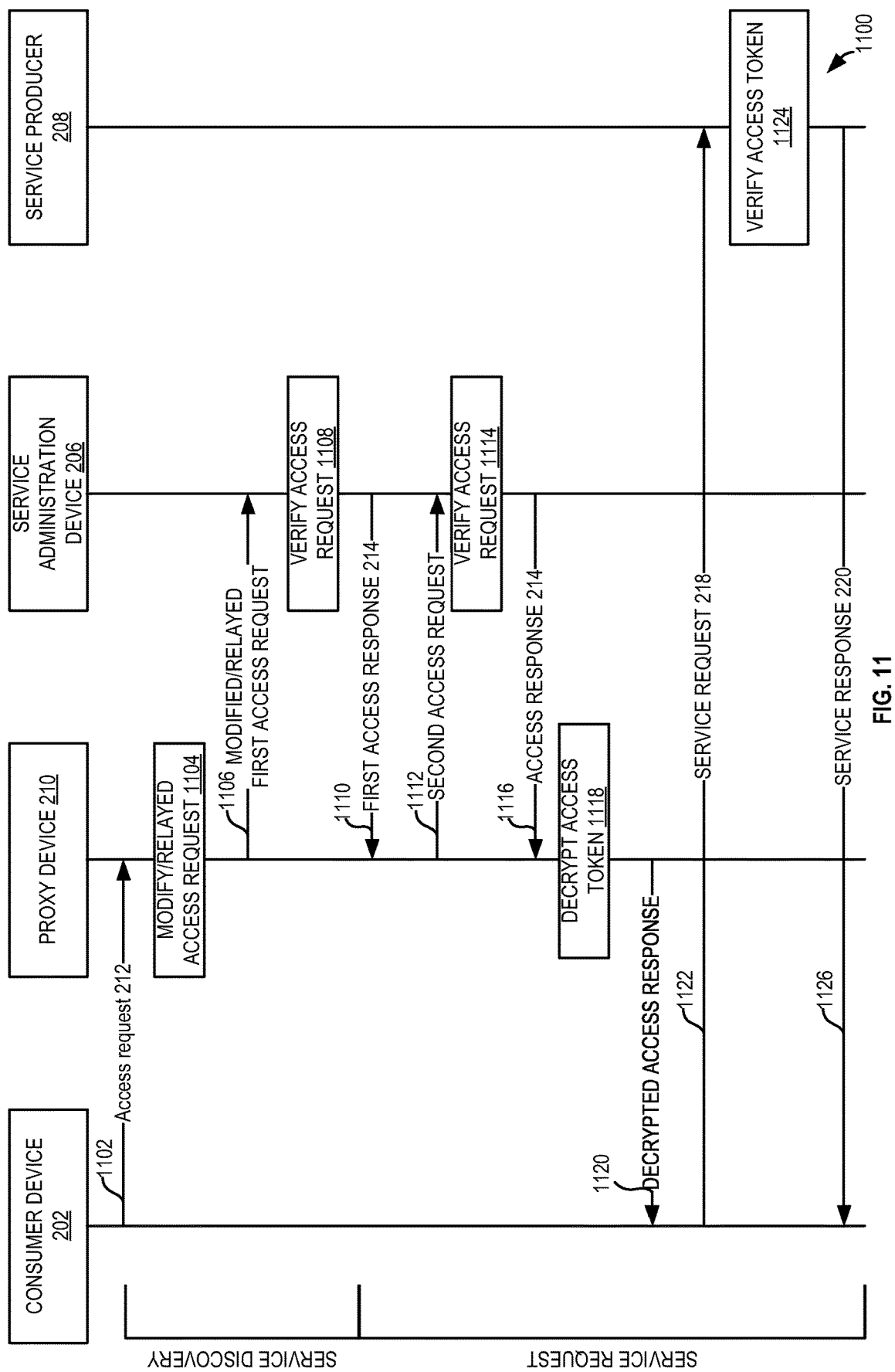
FIG. 11 depicts a flow diagram of verification of a consumer device to use services provided by the service-based architecture via indirect communication with the service administration device through one or more proxy devices, in embodiments.

FIG. 11 depicts a flow diagram 1100 of verification of a consumer device 202 to use services provided by the service-based architecture via indirect communication with the service administration device 206 through one or more proxy devices 210. Only one proxy device 210 is shown, but there may be any number of proxy devices 210 without departing from the scope hereof. In the above-discussed embodiments of FIGS. 7-10, there may be more than one iteration of an access request/response where a first access request is used for discovery purposes to identify the services and service provider devices 208 available within the service network 204. A second access request is then used to obtain an access token for a specific one of said identified services and service provider devices 208.

In step 1102, the consumer device 202 transmits, and the proxy device 210 receives, access request 212 as discussed above. In the particular embodiment of flow 1100, the transmitted access request may include any combination of the above-discussed components of the access request 212. In one particular embodiment, the transmitted access request in step 1102 does not include an authentication certificate, as the required authentication certificate is added in block 1104 by the proxy device 210. In one particular embodiment, the transmitted access request in step 1102 does include an authentication certificate, as the required authentication certificate is relayed in block 1104 by the proxy device 210. Thus, block 1102 encompasses, depending on the specific embodiment, steps 802, 902, and 1002, discussed above.

In step 1104, the proxy device 210 modifies or relays the received access request and/or identity assertion therein to include the necessary information for the proxy device 210 (and in turn the consumer device 202) to be verified by the service administrator device 206. As such, the authentication and access of the consumer device 202 to the service network 204 may be "delegated" to the proxy device 210. For example, the proxy device 210 may modify the received access request to either add, or replace, the access request with an authentication public key certificate (similar to the certificate 302 discussed above) associated with the proxy device 210. Even in the delegated embodiments, however, the modified access request and/or identity assertion (that is then transmitted in step 1106 as discussed below) may include the consumer device ID 308 such that the granted access token (as discussed in blocks 1116-1122) may be associated with the consumer device 202 and the service provider device 208 knows where to send the service response 220. Thus, step 1104 encompasses steps 904 and 1004 discussed above. In embodiments, step 1104 is not included, and the access request received from the consumer device 202 by the proxy device 210 is simply relayed in step 1106, discussed below. Thus, steps 1002-1006 may encompass steps 802-804, discussed above.

In step 1106, the proxy device 210 transmits the first access request which is a modified or relayed access request and/or identity assertion to the service administrator device 206. As the embodiment of flow 1100 includes a discovery process, the first access request may include a service discovery request 310, instead of a provider device ID 308.

In block 1108, the service administrator device 206 verifies the first access request and/or identity assertion therein from block 1106 according to method 500 discussed above.

In step 1110, the service administrator device 206 transmits, to the proxy device 210, a first access response 214 including list of services and service provider device(s) 208 implementing such services.

In step 1112, the proxy device 210 transmits (and generates) a second access request which includes any of the above information of access request 212 discussed above, as well as a provider device ID 308 identified based on the service provider device list provided within the first access response from block 1110.

In block 1114, the service administrator device 206 verifies the second access request and/or identity assertion therein from block 1112 according to method 500 discussed above.

In step 1116, the service administration device 206 transmits an access token 216 as discussed above to the proxy device 210. The access response 214 and access token 216 may be encrypted in any manner as discussed above. In particular, the second access request in step 1112 may include an encryption key (e.g., the encryption key 316) included in the second access request referenced in step 1112 by the proxy device 210. In such embodiments, the access response 214 and/or the access token 216 may be encrypted based on the encryption key 316.

In step 1118, if the access response 214 and/or the access token 216 therein are encrypted, the proxy device 210 decrypts the access response 214 and/or the access token 216 in the access response.

In step 1120, the proxy device 210 transmits, and the service provider device 208 receives, the service request 218, including the access token received by the proxy device(s) 210. The service request transmitted by the proxy device 210 may include an ID (e.g., ID 308) for one or both of the proxy device 210 and the consumer device 202 such that the service provider device 208 may one or both of (1) authenticate and verify the device transmitting the service request 218 (e.g., the proxy device 210), and (2) the device which will receive the service response 220 (e.g., the consumer device 202).

In step 1120, the proxy device 210 relays the access response 214 or the access token 216 (either in decrypted format or decrypted if step 1118 is implemented) to the consumer device 202.

In step 1122, the consumer device 202 transmits, and the service provider device 208 receives, the service request 218, including the access token received by the consumer device 202 from the proxy device(s) 210. In embodiments, the service request 218 may further include another iteration of the identity assertion 301, or any other information discussed above with respect to access request 212 where additional verification of the device transmitting the service request 218 is desired.

In step 1124, the service provider device 208 verifies the access token according to known access token verification procedure. For example, the service provider device 208 may compare the access token information, and associated identity therein, to the device ID included in the service request 218 (and any other necessary information such as timestamp information, etc.), and if there is a match, verify the device transmitting the service request.

In step 1126, if verified, the service provider device 208 transmits a service response 220 to the consumer device 202.

In an embodiment, steps 1120-1126 may be replaced with steps 1014-1018 if the proxy device 210 has also been delegated the functionality of initiating the service request 218 on behalf of the consumer device 202.

Any one or more of the steps of flow 1100 may be implemented via the application on the application layer 602 of the protocol stack 600 as discussed above. For example, the access requests and/or the access tokens discussed above may be embedded in an HTTP header layer, or an HTTP message body within the application layer 602.

Figure 12:
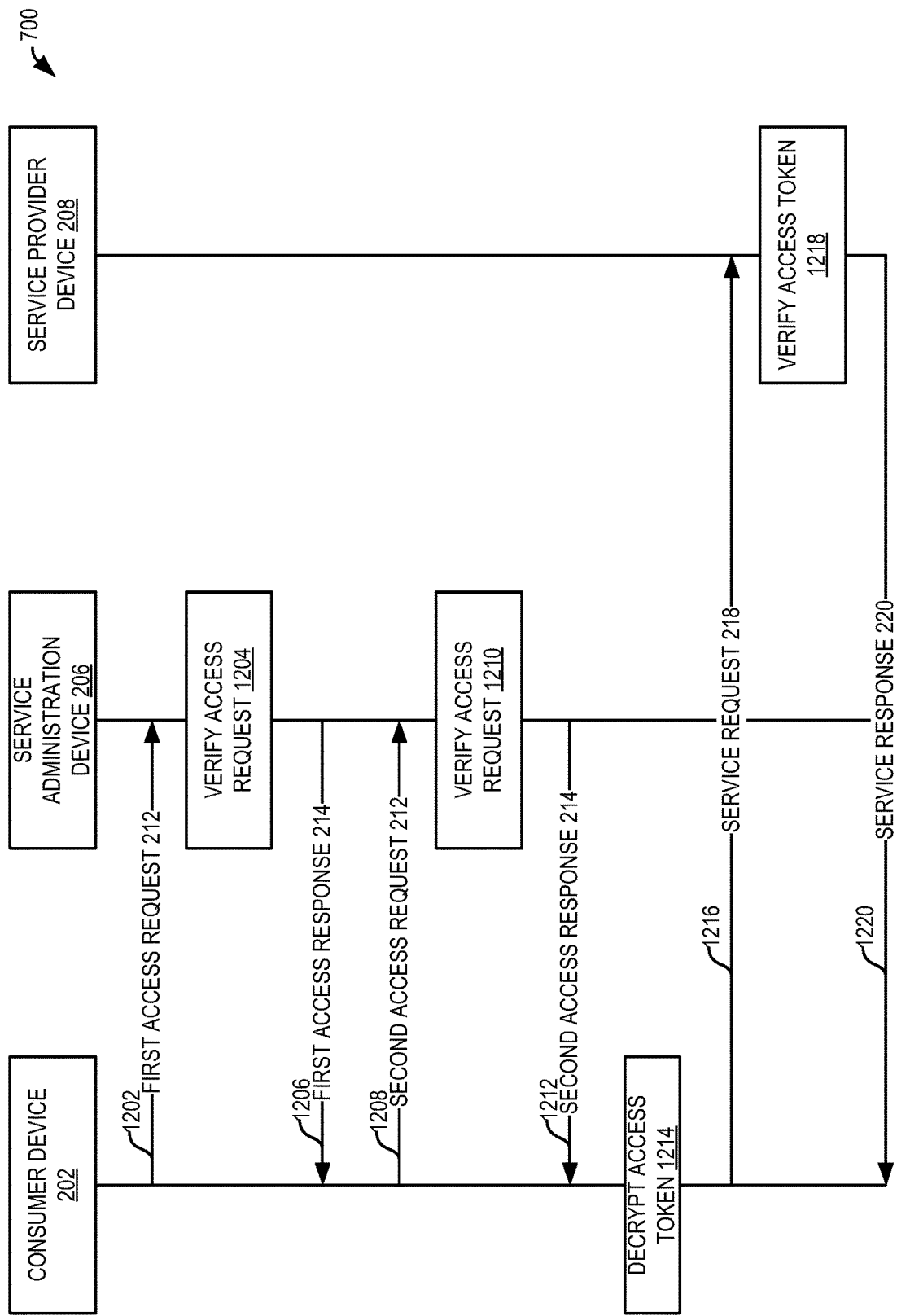
FIG. 12 depicts a flow diagram of verification of a consumer device to use services provided by the service-based architecture via direct communication with the service administration device, in embodiments.

FIG. 12 depicts a flow diagram 1200 of verification of a consumer device 202 to use services provided by the service-based architecture via direct communication with the service administration device 206. In the above-discussed embodiments of FIGS. 7-10, there may be more than one iteration of an access request/response where a first access request is used for discovery purposes to identify the services and service provider devices 208 available within the service network 204. A second access request is then used to obtain an access token for a specific one of said identified services and service provider devices 208.

In step 1202, the consumer device 202 transmits, and the service administration device 206 receives, access request 212 as discussed above. In the particular embodiment of flow 1202, the transmitted access request may include any combination of the above-discussed components of the access request 212. In one particular embodiment, the transmitted access request in step 1202 includes the identity assertion 301, including authentication public key certificate 302, the consumer device ID 306, and the service discovery request 310, as well as any one or more additional components of the access request 212 discussed above with respect to FIG. 3.

In step 1204, the service administrator device 206 verifies the first access request, and/or identity assertion therein, from block 1202 according to method 500 discussed above.

In step 1206, the service administrator device 206 transmits, to the consumer device 202, a first access response 214 including list of services and service provider device(s) 208 implementing such services.

In step 1208, the consumer device 202 transmits (and generates) a second access request which includes any of the above information of access request 212 discussed above, as well as a provider device ID 308 identified based on the service provider device list provided within the first access response from block 1206.

In block 1210, the service administrator device 206 verifies the second access request from block 1208 according to method 500 discussed above.

In step 1212, the service administration device 206 transmits an access token 216 as discussed above to the consumer device 202. The access response 214 and access token 216 may be encrypted in any manner as discussed above. In particular, the second access request in step 1208 may include an encryption key (e.g., the encryption key 316) included in the second access request referenced in step 1208 by the consumer device 202. In such embodiments, in step 1212, the access response 214 and/or the access token 216 may be encrypted based on the encryption key 316.

In step 1214, if the access response 214 and/or the access token 216 therein are encrypted, the consumer device 202 decrypts the access response 214 and/or the access token 216 in the access response.

In step 1216, the consumer device transmits, and the service provider device 208 receives, the service request 218, including the access token received by the consumer device 202 from the service administration device 206. The service request transmitted by the consumer device 202 may include the identity assertion consisting of the consumer device ID 308 and other information elements as depicted in FIG. 3 for the consumer device 202 such that the service provider device 208 may one or both of (1) authenticate and verify the device transmitting the service request 218 (e.g., the consumer device 202), and (2) the device which will receive the service response 220 (e.g., the consumer device 202). In embodiments, the service request 218 may further include another iteration of the identity assertion 301, or any other information discussed above with respect to access request 212 where additional verification of the device transmitting the service request 218 is desired.

In step 1218, the service provider device 208 verifies the access token according to known access token verification procedure. For example, the service provider device 208 may compare the access token information, and associated identity therein, to the device ID in the identity assertion included in the service request 218 (and any other necessary information such as timestamp information, etc.), and if there is a match, verify the device transmitting the service request.

In step 1220, if verified, the service provider device 208 transmits a service response 220 to the consumer device 202.

Any one or more of the steps of flow 1200 may be implemented via the application on the application layer 602 of the protocol stack 600 as discussed above. For example, the access requests and/or the access tokens discussed above may be embedded in an HTTP header layer, or an HTTP message body within the application layer 602.

Figure 13:
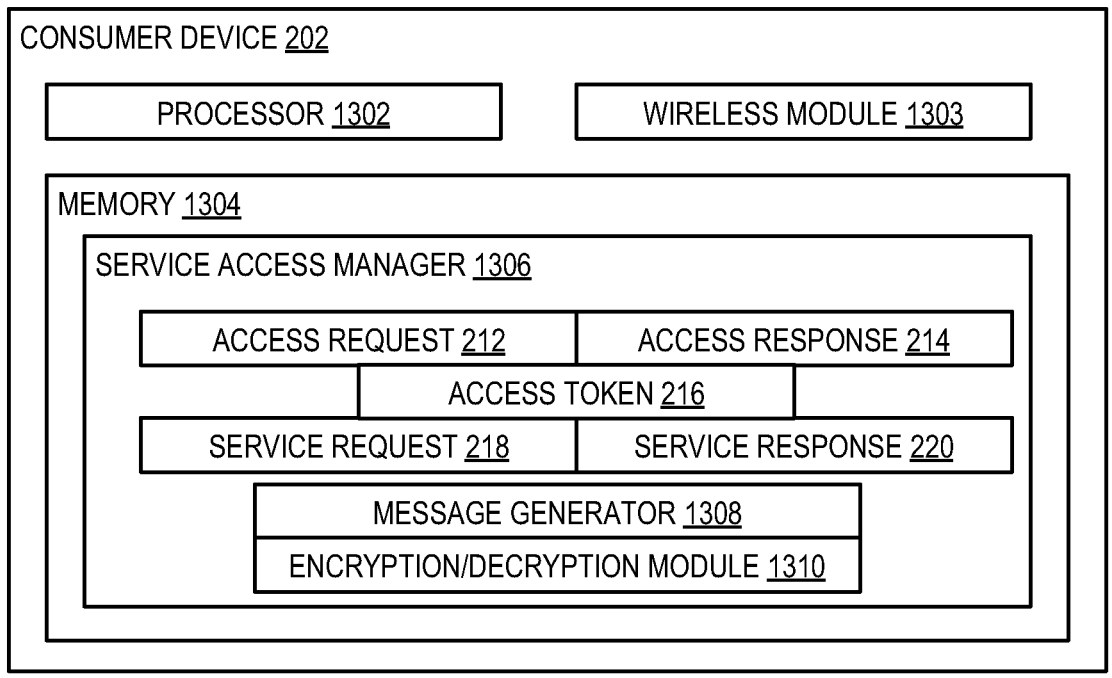
FIG. 13 depicts an example block diagram of the consumer device of FIG. 2, in embodiments.

FIG. 13 depicts an example block diagram of the consumer device 202. Consumer device 202 may include a processor 1302 in operative communication with memory 1304. The processor 1302 includes computing hardware capable of executing non-transitory computer readable instructions. For example, the processor 1302 may be any one or more of a general-purpose computer, a digital signal processor, central processing unit (CPU), field-programmable gate array (FPGA), system-on-chip (SoC), or another type of integrated circuit capable of performing logic, control, and input/output operations. Memory 1304 includes, but is not limited to, a computer-readable medium, such as a random-access memory (RAM), and a computer-readable non-volatile medium, such as flash memory. Additionally, or alternatively, any other type of memory may be utilized without departing from the scope hereof.

The consumer device 202 further includes a communications module 1303 which includes any hardware and firmware necessary to communicate with one or more other devices in SBA 200 discussed above, such as the service administration device 206, service provider device 208, and any proxy device(s) 210 therebetween. In embodiments, the communications module 1303 may implement wired communications. In additional or alternative embodiments, the communications module 1303 may implement wireless communications. The communications module 1303 may operate according to 5G communications protocol as defined by 3GPP.

Memory 1304 includes service access manager 1306 as non-transitory computer readable instructions that, when executed by the processor 1302, cause the processor 1302 to implement the functionality of the service access manager 1306 and consumer device 202 discussed herein. Service access manager 1306 may implement an message generator 1308 and an encryption/decryption module 1310 that are responsible for generating, receiving, and transmitting one or more of the access request 212, the access token 216 received in an access response 214, service request 218, and service response 220 as discussed above. As such, the service access manager 1306 implements any of the functionality of the consumer device 202 discussed above with respect to FIGS. 2-12.

The message generator 1308 may be responsible for creating an application layer (e.g., application layer 602 discussed above) message including the access request 212. For example, the message generator 1308 may create a new application layer message, or modify an existing application message, to include the access request 212 information discussed above in the application message. For example, the message generator 1308 may modify one or both of an HTTP header and an HTTP message body to include the access request 212 information discussed above.

The encryption/decryption module 1310 may be responsible for encrypting and decrypting the information included in one or more of the access request 212, access response 214, access token 216, service request 218, and service response 220.

Figure 14:
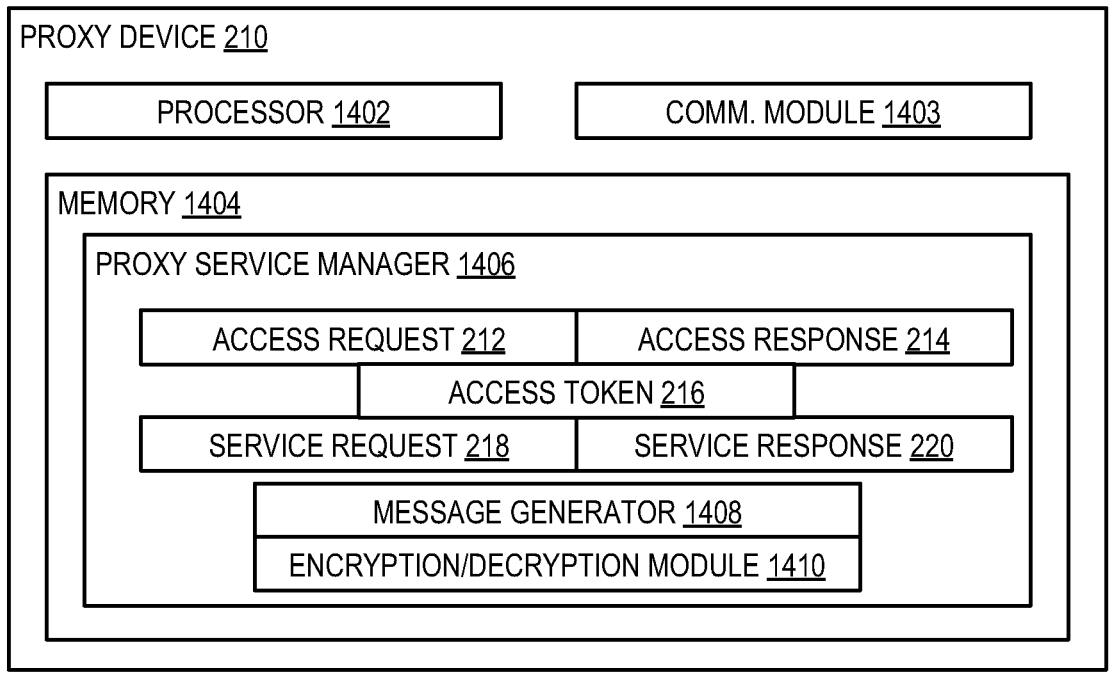
FIG. 14 depicts an example block diagram of the proxy device of FIG. 2, in embodiments.

FIG. 14 depicts an example block diagram of the proxy device 210. Proxy device 210 may include a processor 1402 in operative communication with memory 1404. The processor 1402 includes computing hardware capable of executing non-transitory computer readable instructions. For example, the processor 1402 may be any one or more of a general-purpose computer, a digital signal processor, central processing unit (CPU), field-programmable gate array (FPGA), system-on-chip (SoC), or another type of integrated circuit capable of performing logic, control, and input/output operations. Memory 1404 includes, but is not limited to, a computer-readable medium, such as a random-access memory (RAM), and a computer-readable non-volatile medium, such as flash memory. Additionally, or alternatively, any other type of memory may be utilized without departing from the scope hereof.

The proxy device 210 further includes a communications module 1403 which includes any hardware and firmware necessary to communicate with one or more other devices in SBA 200 discussed above, such as the consumer device 202, the service administration device 206, and the service provider device 208. In embodiments, the communications module 1403 may implement wired communications. In additional or alternative embodiments, the communications module 1403 may implement wireless communications. The communications module 1403 may operate according to 5G communications protocol as defined by 3GPP.

Memory 1404 includes proxy service manager 1406 as non-transitory computer readable instructions that, when executed by the processor 1402, cause the processor 1402 to implement the functionality of the proxy service manager 1406 and proxy device(s) 210 discussed herein. Proxy service manager 1406 may implement a message generator 1408 and an encryption/decryption module 1410 that are responsible for generating, receiving, and transmitting one or more of the access request 212, the access token 216 received in an access response 214, service request 218, and service response 220 as discussed above. As such, the proxy service manager 1406 implements any of the functionality of the proxy device 210 discussed above with respect to FIGS. 2-12.

The message generator 1408 may be responsible for creating an application layer (e.g., application layer 602 discussed above) message including the access requests (either relayed or modified), the access responses, the service requests, and the service responses discussed above. For example, the message generator 1408 may create a new application layer message, or modify an existing application layer message, to include any of the access requests (either relayed or modified), the access responses, the service requests, and the service response information discussed above, with respect to FIGS. 8-11, in the application layer message. For example, the message generator 1408 may modify one or both of an HTTP header and an HTTP message body to include any of the access requests (either relayed or modified), the access responses, the service requests, and the service response information discussed above, with respect to FIGS. 8-11.

The encryption/decryption module 1410 may be responsible for encrypting and decrypting the information included in one or more of any of the access requests (either relayed or modified), the access responses, the service requests, and the service response information discussed above, with respect to FIGS. 8-11.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for proxy-based communication, comprising:
    receiving, at a proxy device and from a first device, an access request comprising:
        a request to use a service,
        a first identifier of the first device, and
        a second identifier of a second device that the first device intends to communicate with;
    generating, at the proxy device, a modified access request based on the access request, the modified access request comprising:
        the request to use the service, and
        an identity assertion associated with the proxy device;
    transmitting the modified access request from the proxy device to a first service element;
    receiving, at the proxy device and from the first service element, an access response including an access token that allows access to the service.

2. The method of claim 1, the identity assertion associated with the proxy device including the first identifier of the first device.

3. The method of claim 1, the access request further comprising an identity assertion associated with the first device.

4. The method of claim 3, the identity assertion comprising an encryption key; one or both of (1) one or more parameters in the access response, and (2) the access token being encrypted based on the encryption key.

5. The method of claim 3, the identity assertion comprising:
    an authentication public key certificate associated with the first device or the proxy device,
    the identifier of the first device, and
    a digital signature using a private key associated with the authentication public key certificate.

6. The method of claim 5, the identity assertion further comprising at least one of:
    an initiation time defining when the identity assertion was generated, and
    an expiration time defining when the identity assertion expires.

7. The method of claim 1, further comprising transmitting the access token to the first device.

8. The method of claim 1, further comprising decrypting, at the proxy device, the access token.

9. The method of claim 8, further comprising transmitting the decrypted access token to the first device.

10. The method of claim 1, further comprising transmitting, from the proxy device and to a service provider device, a service request comprising the access token and the identifier of the first device.

11. The method of claim 1, the first service element being a second proxy device.

12. The method of claim 1, the access token including a service producer device identifier.

13. The method of claim 12, the service producer device being different than the first service element.

14. The method of claim 1, the transmitting the access request or the modified access request including forwarding the access request in an application layer of a protocol stack.

15. The method of claim 1, the first service element being provided by a service-based architecture.

* * * * *